(12) United States Patent
Tan

(10) Patent No.: US 12,438,461 B2
(45) Date of Patent: Oct. 7, 2025

(54) SWITCHING REGULATOR WITH RAMP INJECTION SWITCH

(71) Applicant: Renesas Electronics America Inc., Milpitas, CA (US)

(72) Inventor: Zheyuan Tan, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 251 days.

(21) Appl. No.: 18/162,932

(22) Filed: Feb. 1, 2023

(65) Prior Publication Data
US 2024/0258919 A1 Aug. 1, 2024

(51) Int. Cl.
*H02M 3/158* (2006.01)
(52) U.S. Cl.
CPC .................................. *H02M 3/158* (2013.01)
(58) Field of Classification Search
CPC ...................................................... H02M 3/158
USPC ........................................................ 323/282
See application file for complete search history.

(56) References Cited

U.S. PATENT DOCUMENTS

| 8,018,249 B2* | 9/2011 | Koch | G06F 15/7867 |
| | | | 326/38 |
| 11,728,722 B2* | 8/2023 | Sun | H02M 5/293 |
| | | | 363/13 |
| 2022/0209646 A1* | 6/2022 | Sun | H02M 1/0009 |

* cited by examiner

*Primary Examiner* — Thienvu V Tran
*Assistant Examiner* — Lauren Ashley Shaw
(74) *Attorney, Agent, or Firm* — SCULLY, SCOTT, MURPHY & PRESSER, P.C.

(57) ABSTRACT

A switched-mode power supply, such as a constant on time regulator, is presented. The switched-mode power supply includes a high side power switch coupled to a low side power switch at a switching node. A ramp injection circuit is coupled to the switching node and a ramp switch is coupled to the ramp injection circuit are also provided. A driver is used to drive the high side power switch and the low side power switch and to control the ramp switch. The driver turns off the ramp switch when the switch-mode power supply enters a tri-state, and turns the ramp switch back on when the switch-mode power supply exists the tri-state. The tri-state occurs when the switched-mode power supply operates in a discontinuous current mode, when both the high side power switch and the low side power switch are turned off.

16 Claims, 10 Drawing Sheets

SWITCHING REGULATOR WITH RAMP INJECTION SWITCH

TECHNICAL FIELD

The present disclosure relates to a switching regulator with ramp injection switch and in particular to a constant on time (COT) switching regulator with reduced group pulsing behaviour.

BACKGROUND

Switching regulators such as buck regulators are used in many different applications for providing a desired output (current or voltage) to a chosen circuit.

Constant-on-time (COT) buck regulators have several advantages over traditional current and voltage mode control regulators including faster transient response, higher efficiency and a relatively simpler design. In a COT regulator the output voltage is sensed via feedback resistors. The output ripple voltage is compared with a reference voltage to generate pulse signals to control the high-side and low-side power switches. Depending on the load, COT regulators can operate in discontinuous conduction mode (DCM) or continuous conduction mode (CCM). The COT regulator can often become unstable and start operating with subharmonic oscillations. To overcome this, a ramp injection circuit with a ramp resistor is often implemented in the COT regulator. A ramp injection of high amplitude is often needed to prevent jitter when the COT regulator is operating in CCM, however this results in group pulsing behaviour when the regulator starts operating in DCM. This behaviour reduces efficiency and the transient response of the COT regulator during DCM.

It is an object of the disclosure to address one or more of the above mentioned limitations.

SUMMARY

According to a first aspect of the disclosure, there is provided a switched mode power supply comprising a high side power switch coupled to a low side power switch at a switching node; a ramp injection circuit coupled to the switching node; a ramp switch coupled to the ramp injection circuit; and a driver configured to drive the high side power switch and the low side power switch and to control the ramp switch so as to turn off the ramp switch when the switch mode power supply enters a tri-state, and to turn the ramp switch back on when the switch mode power supply exits the tri-state; wherein the tri-state occurs when the switched mode power supply operates in a discontinuous current mode, when both the high side power switch and the low side power switch are turned off.

Optionally, the driver is configured to sense when the switched mode power supply is operated in the discontinuous conduction mode, and to control the ramp switch during discontinuous conduction mode operation.

Optionally, the discontinuous conduction mode is sensed based on a state of the high side power switch and a state of the low side power switch.

For instance, the DCM mode may be sensed when the high side power switch and the low side power switch are both off for a duration greater than a threshold value.

Optionally, the driver is adapted to generate a control signal for controlling the ramp switch.

Optionally, the driver comprises a logic gate for generating the control signal, the logic gate having a first input adapted to receive a first signal indicative of a state of the high side power switch and a second input adapted to receive a second signal indicative of a state of the low side power switch.

Optionally, wherein the logic gate comprises an OR gate.

Optionally, wherein the first signal derives from a high side drive signal for driving the high side power switch, and wherein the second signal derives from a low side drive signal for driving the low side power switch.

Optionally, the ramp injection circuit comprises a resistor coupled to a capacitor.

Optionally, the ramp switch is provided between the switching node and the resistor, or between the resistor and the capacitor of the ramp injection circuit.

Optionally, the ramp injection circuit is coupled to a resistive divider at a feedback node. For instance the ramp injection circuit may be coupled to the feedback node via another capacitor, or another resistor, or a wire connection.

Optionally, the switched mode power supply comprises a comparator having a first input coupled to the feedback node, and a second input for receiving a reference voltage.

Optionally, the switched mode power supply comprises a pulse generator coupled to the comparator.

Optionally, the switched mode power supply is a constant on time converter.

Optionally, the switched mode power supply is a buck converter.

Optionally, the ramp switch is a bidirectional switch. For instance, the bidirectional switch may be implemented using two transistors in a back-to-back configuration.

According to a second aspect of the disclosure, there is provided a method of operating a switched mode power supply having a high side power switch coupled to a low side power switch at a switching node, the method comprising providing a ramp injection circuit coupled to the switching node;
providing a ramp switch coupled to the ramp injection circuit;
driving the high side power switch and the low side power switch;
turning off the ramp switch when the switched mode power supply enters a tri-state, and
turning the ramp switch back on when the switched mode power supply exists the tri-state; wherein the tri-state occurs when the switched mode power supply operates in a discontinuous current mode, when both the high side power switch and the low side power switch are turned off.

The options described with respect to the first aspect of the disclosure are also common to the second aspect of the disclosure.

DESCRIPTION OF THE DRAWINGS

The disclosure is described in further detail below by way of example and with reference to the accompanying drawings, in which.

DESCRIPTION

Figure 1:
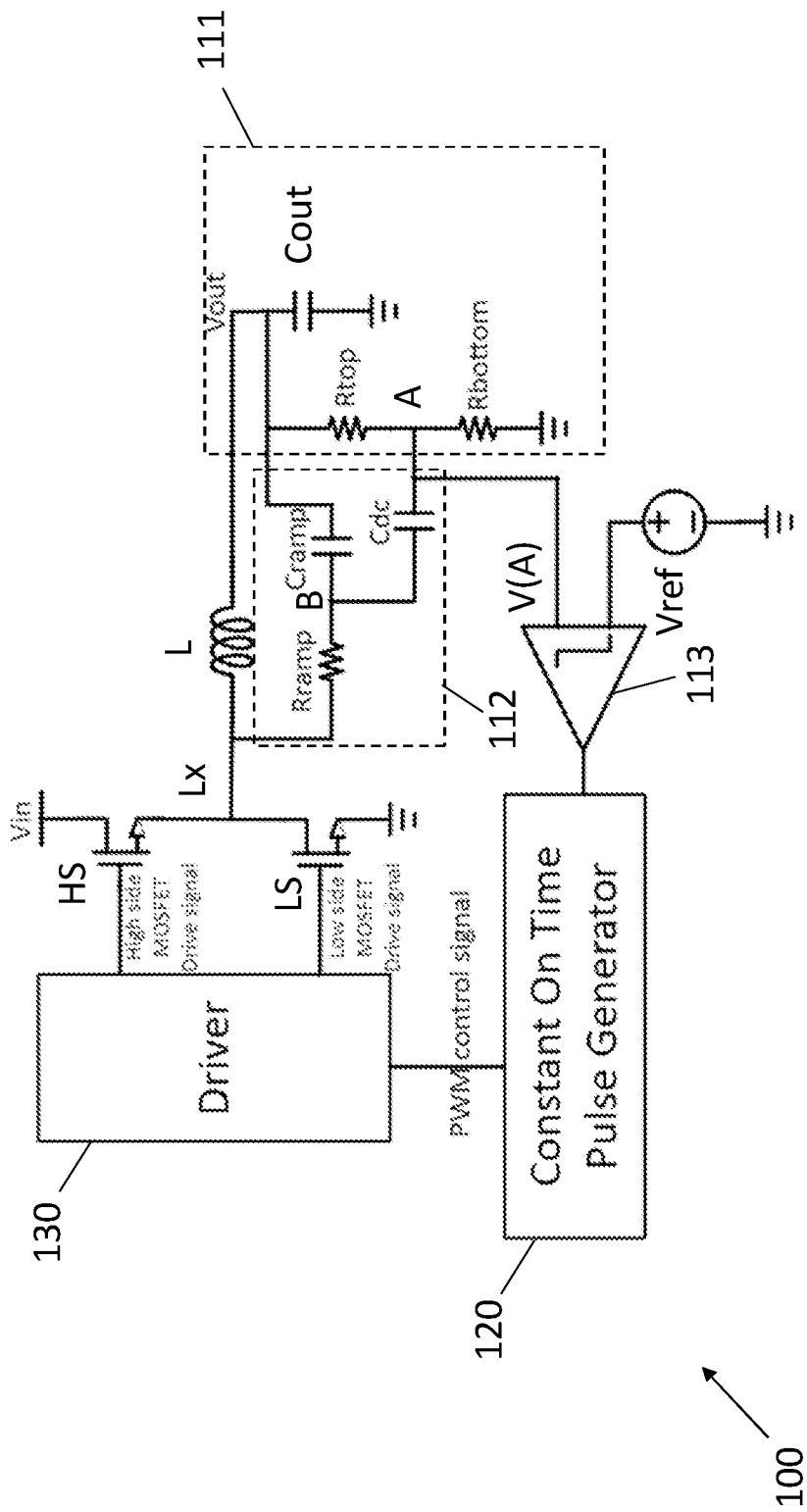
FIG. 1 is a circuit diagram of a constant-on-time buck regulator with ramp injection according to the prior art.

FIG. 1 illustrates a circuit diagram of a constant-on-time buck regulator according to the prior art.

The buck regulator 100 includes a high side power switch HS, a low side power switch LS coupled to an inductor L at a switching node LX. The inductor L is coupled to an output stage 111 formed of an output capacitor Cout, and a resistance ladder having first resistance Rtop and a second resistance Rbottom coupled at node A. A ramp injection circuit 112 is coupled between the switching node Lx and the output stage 111. The ramp injection circuit 112 has a resistance Rramp in series with a capacitor Cramp at node B. Another capacitor Cdc is provided between nodes A and B. In an alternative implementation the capacitor Cdc can be replaced by a short wire or a resistance Rdc provided that Rramp>>RT=((Rtop*Rbottom)/(Rtop+Rbottom)). For instance, if Rramp is about 100 times greater than RT.

A comparator 113 has a first input coupled to the injector circuit 112 and a second input coupled to a reference voltage generator. The output of the comparator 113 is coupled to a pulse generator 120. The pulse generator 120 is coupled to a driver 130 which is provided to drive the HS and LS power switches. These switches may be metal-oxide semiconductor field-effect transistors (MOSFETs).

In operation, the comparator 113 compares the feedback voltage V(A) at node A to a reference voltage Vref and determines when the output voltage falls below the reference voltage. The output of the comparator 113 provides a signal to the pulse generator 120 which is configured to send a control signal to the driver 130 to control the high-side and low-side power switches. The pulse generator 120 produces a signal waveform pulse such as a pulse width modulation PWM signal.

For the constant-on-time buck regulator 100 there are two modes of operation: a discontinuous conduction mode (DCM) and continuous conduction mode (CCM). In CCM mode, the ramp injection circuit 112 injects a triangular voltage waveform at the feedback node A corresponding to the negative input of comparator 113. The amplitude of the ramp injection is function Rramp. When a ramp injection of high amplitude is required, the value of Rramp may be chosen to be relatively small. DCM operation occurs when the current through the inductor L fully discharges when it is disconnected from either Vin or ground (i.e. when both the high-side and low-side power switches are off). If the current does not fully discharge during the off-time of both switches, then the constant-on-time buck regulator operates in CCM.

The constant-on-time buck regulator operates in CCM when there is a relatively high load current. Under these conditions the noise in the circuit results in a level of jitter being present in the signal waveforms sent from the pulse generator 120 to the driver 130. By implementing a high amplitude ramp injection for the ramp injection circuit 112, the level of jitter during CCM operation can be reduced. However, the implementation of such a high ramp injection causes instabilities in the operation of the regulator once it switches to DCM.

Figure 2:
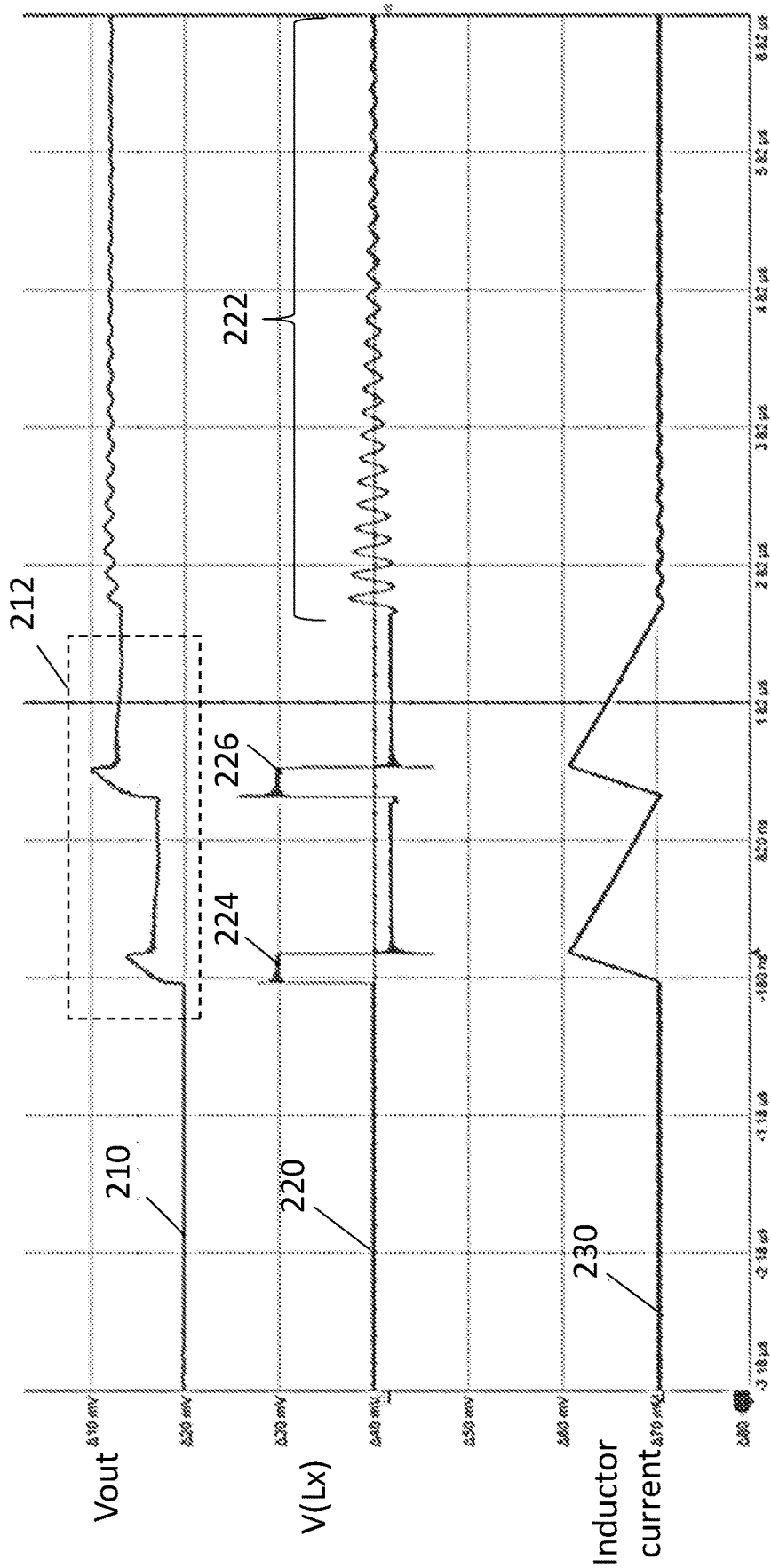
FIG. 2 is a plot showing the output voltage and voltage at the switching node during DCM operation for the regulator of FIG. 1.

FIG. 2 is a plot showing the output voltage 210, the voltage V(Lx) 220 at switching node Lx, and the inductor current 230 for the constant-on-time buck regulator 100 of FIG. 1. Measurements are obtained under light-load current in DCM operation with a high ramp injection.

The switching node voltage V(Lx) displays periods of oscillations labelled 222. These oscillations are due to inductor and MOSFET output parasitic capacitor ringing during DCM tri-state. The tri-state phase occurs only when the regulator is operating in DCM when both the high-side power switch and the low-side power switches are off. This state can last from several μs to several ms. The tri-state may start after the inductor current IL reaches a zero value to operate the switch-mode power supply in a discontinuous current mode.

A so-called group pulsing behavior occurs when multiple switching node voltage pulses (shown as square Lx pulses) arise close to each other in one group. Several groups of multiple Lx pulses can occur spaced by a relatively long group pulsing period. In FIG. 2 a group of two Lx pulses 224 and 226 is shown. The Lx pulses 224 and 226 are close to each other. Subsequent groups of Lx pulses (not shown) are temporally spaced from each other by a group pulsing period. Such a group pulsing behavior tends to increase output ripples.

When the COT buck regulator is operating in DCM with a high ramp injection, several signals are sent in quick succession from the comparator 113 to the generator 120 due to the feedback voltage V(A) not increasing above the reference voltage Vref (ramp injection is reducing the voltage V(A)). The group pulsing behaviour then prevents the gradual charge up of output voltage, and result in a rush of multiple pulses with large ripple.

The group pulsing behaviour observed in the switching node voltage 220 is reflected in the output voltage 210 as periods when the output ripple is increased (see for instance region 212). This highlights the problem with using a high ramp injection for light-load currents in DCM.

Figure 3:
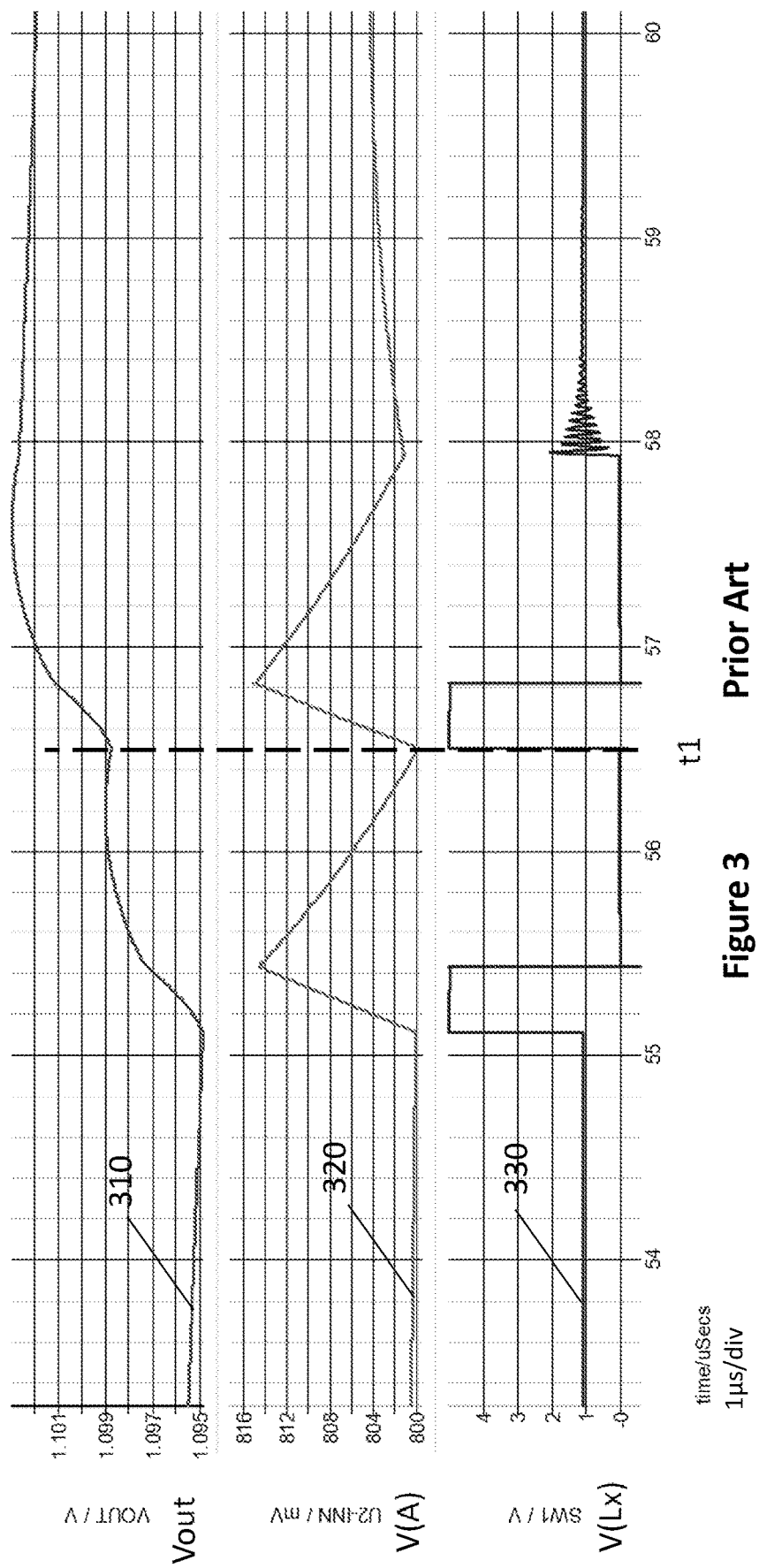
FIG. 3 is a plot showing the simulated output voltage and feedback voltage of the regulator of FIG. 1 as a function of time.

FIG. 3 is a plot showing the simulated output voltage 310 and feedback voltage V(A) 320 of the COT regulator of FIG. 1 as a function of time. For clarity the switching voltage V(Lx) is also represented at reference 330 showing group pulsing behaviour. In this simulation, the regulator is operating under light-load current in DCM mode with high ramp injection.

At time t1, the feedback voltage V(A) 320 falls below zero and another V(A) pulse is triggered. This triggers the pulse generator 120 to send numerous pulses in quick succession. This behaviour also affects the output voltage 310 which is unable to build up in a smooth, continuous manner.

Figure 4:
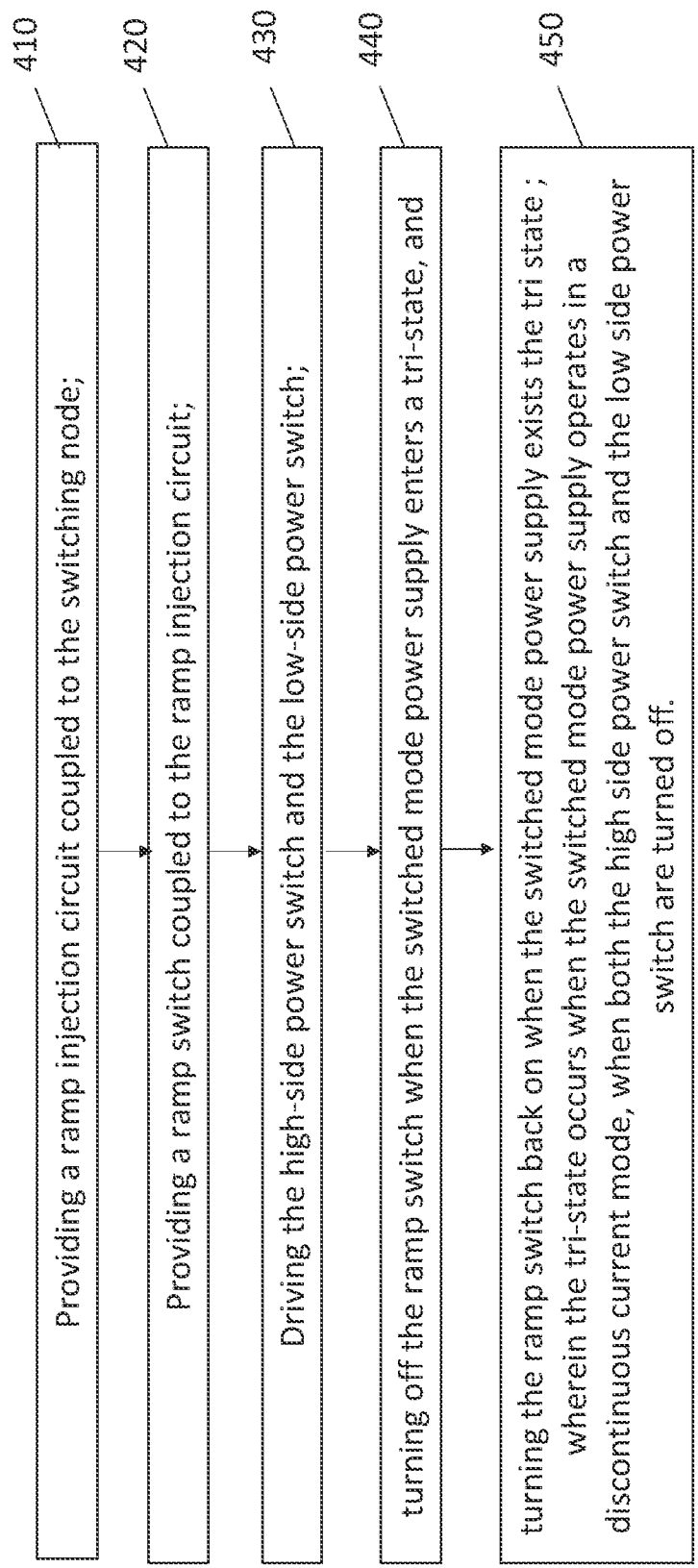
FIG. 4 is a flow chart of a method for controlling a switching converter according to the disclosure.

FIG. 4 is a flow chart of a method of controlling a switching converter. The switching converter may be a COT converter comprising a high side power switch coupled to a low side power switch at a switching node.

At step 410 a ramp injection circuit is provided, coupled to the switching node. At step 420 a ramp switch coupled to the ramp injection circuit is provided. The ramp switch may also be referred to as ramp injection switch. At step 430, the high-side and low-side power switches are driven. At step 440, the ramp switch is turned off when the switch-mode power supply enters a tri-state. At step 450 the ramp switch is turned back on when the switch-mode power supply exits the tri-state. The tri-state occurs when the switched-mode power supply operates in a discontinuous current mode (DCM), when both the high side power switch and the low side power switch are turned off. For instance the tri-state may start when both the high-side and low-side power switches are turned off after the inductor current reaches a zero value to operate the switch-mode power supply in DCM.

Figure 5A:
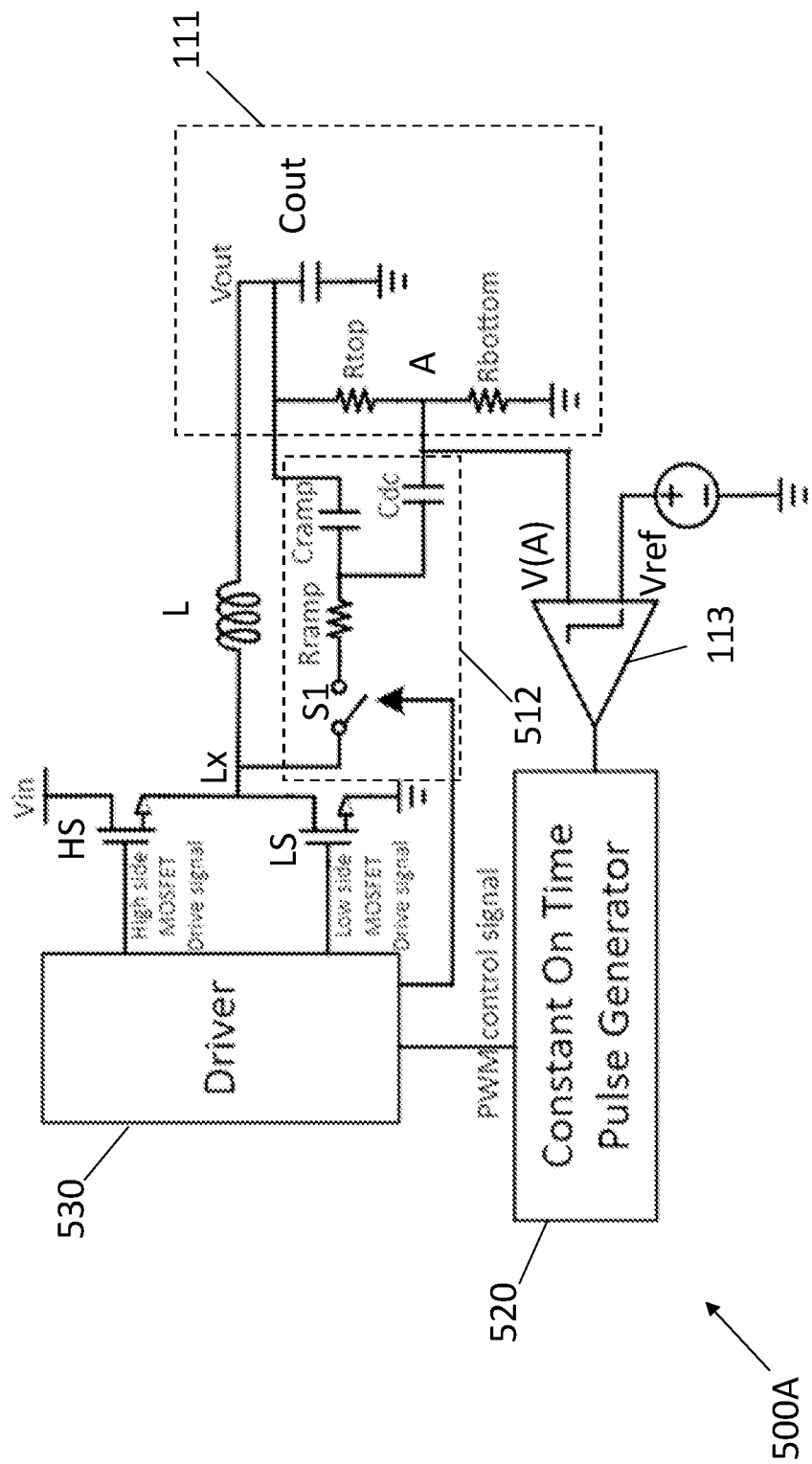
FIG. 5A is a diagram of a regulator for implementing the method of FIG. 4.

FIG. 5A is a circuit diagram of a constant-on-time buck regulator 500A for implementing the method of FIG. 4.

The circuit of FIG. 5A shares similar components to those illustrated in the circuit of FIG. 1. The same reference numerals have been used to represent corresponding components and their description will not be repeated for the sake of brevity. In this circuit an additional ramp switch S1 is added to the ramp injection circuit 512 between switching node Lx and the resistor Rramp. The ramp switch S1 may be a bidirectional switch. A bidirectional switch may be constructed by connecting two transistors (MOSFETs or IGBTs) back to back in series. For instance, the bidirectional switch may be implemented using two MOSFET transistors back to back, for instance drain connected to drain or source connected to source. When switched-off (open) the ramp switch S1 would block the current in both directions. The driver 530 has an additional output for controlling the ramp switch S1. The driver 530 is configured to sense when the switched-mode power supply is operated in DCM, and to control the ramp switch during DCM operation. The output of the comparator 113 is coupled to the generator 520.

In operation, the driver 530 sends drive signals to drive the HS and LS power switches respectively. When the constant-on-time buck regulator is in DCM operation, the driver 530 sends a control signal Ct1 to turn off (open) the ramp switch S1 when the switch-mode power supply enters the tri-state, and to turn the ramp switch S1 back on (closed) when the switch-mode power supply exits the tri-state. When both the high side and low side power switches are off (during tri-state), the device is in DCM mode.

The signal Ct1 may be generated based on the state of the HS and LS power switches. If both the high-side and low-side switches are off, Ct1 is low (logic 0) and the ramp switch S1 is turned off, hence blocking the ramp injection at the switching node Lx. If one or both of the high-side and low-side switches are on, the signal Ct1 is high (logic 1) and the ramp switch S1 is then turned back on, hence allowing ramp injection.

Figure 5B:
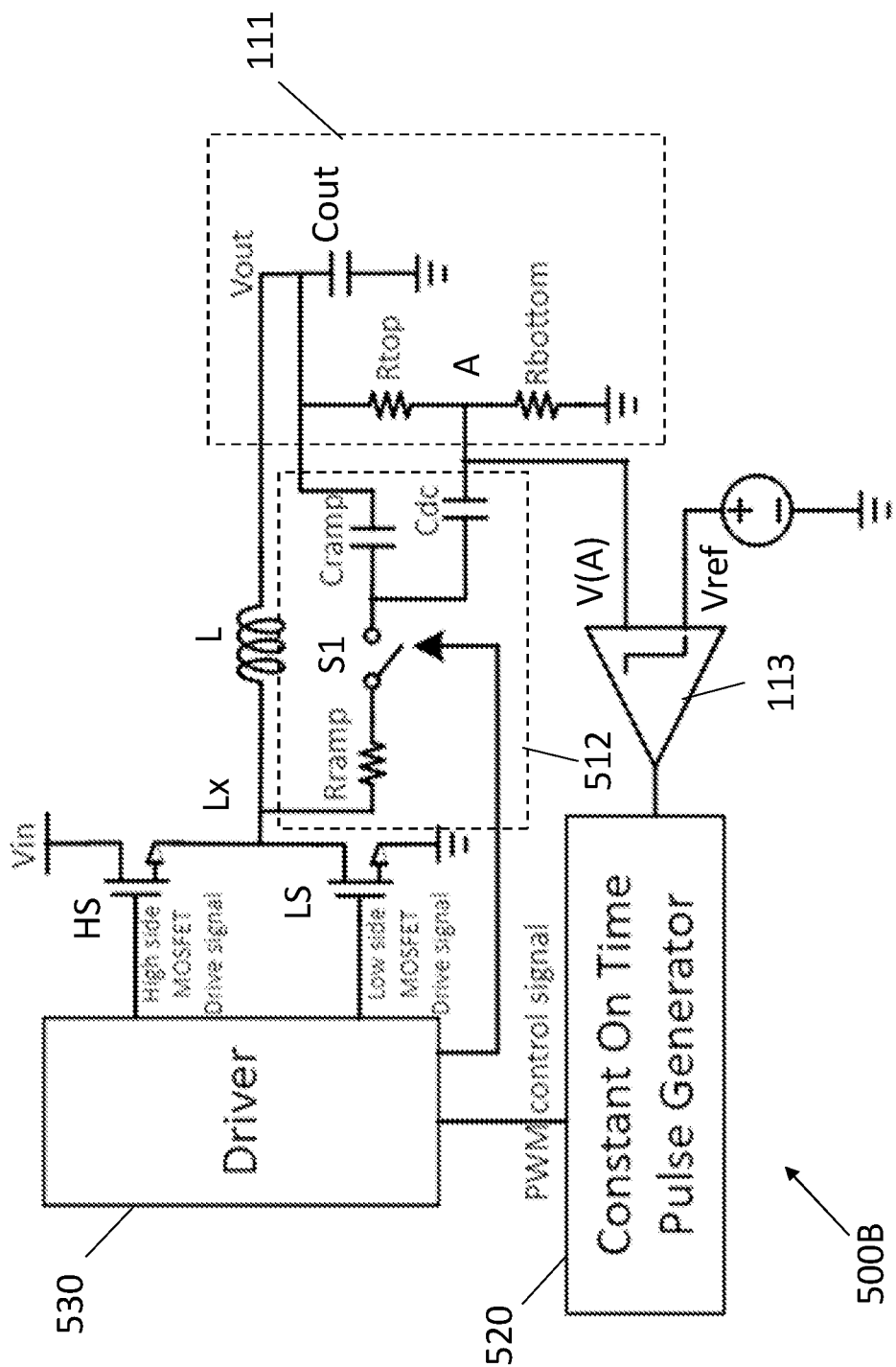
FIG. 5B is a diagram of another regulator for implementing the method of FIG. 4.

FIG. 5B illustrates an alternative embodiment of the constant-on-time buck regulator shown in FIG. 5A. The same reference numerals have been used to represent corresponding components. In this embodiment, the ramp switch S1 in the ramp injection circuit 512 is coupled between the resistor Rramp and the capacitor Cramp. Overall the topology of FIG. 5A would couple less noise to the comparator input. An alternative implementation of the constant-on-time regulators 500A and 500B in FIGS. 5A and 5B, repectively, is to replace the capacitor Cdc by a resistance Rdc, or a simple wire connection between nodes A and B, as explained above with reference to FIG. 1.

Figure 6:
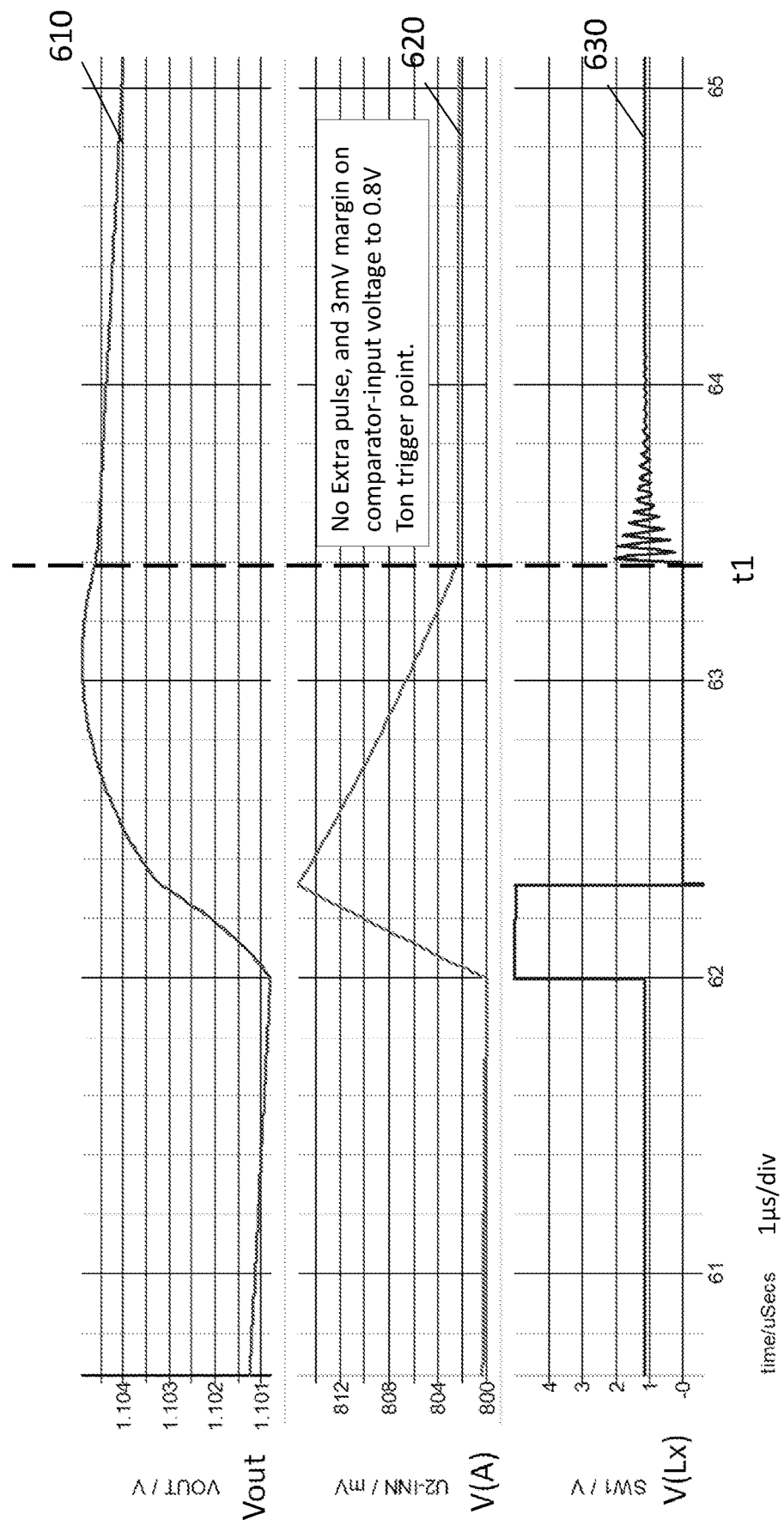
FIG. 6 is a plot showing the simulated output voltage and feedback voltage of the regulator of FIG. 5, as a function of time.

FIG. 6 is a plot showing the simulated output voltage 610, the feedback voltage V(A) 620, and the switching node voltage 630 of the COT regulator of FIG. 5 (5A or 5B) as a function of time. In this simulation, the regulator is operating under light-load current in DCM mode with high ramp injection. The simulations of FIG. 6 can be compared to the simulations of FIG. 3 for the prior art.

The constant-on-time buck regulator with the added ramp switch S1 no longer shows group pulsing behaviour during DCM operation. At time t1, there is no extra Lx pulse as now the feedback voltage 620 remains a margin above the reference voltage trigger point for the comparator 113. Compared with FIG. 3, the output voltage 610 has reduced output ripples.

Figure 7:
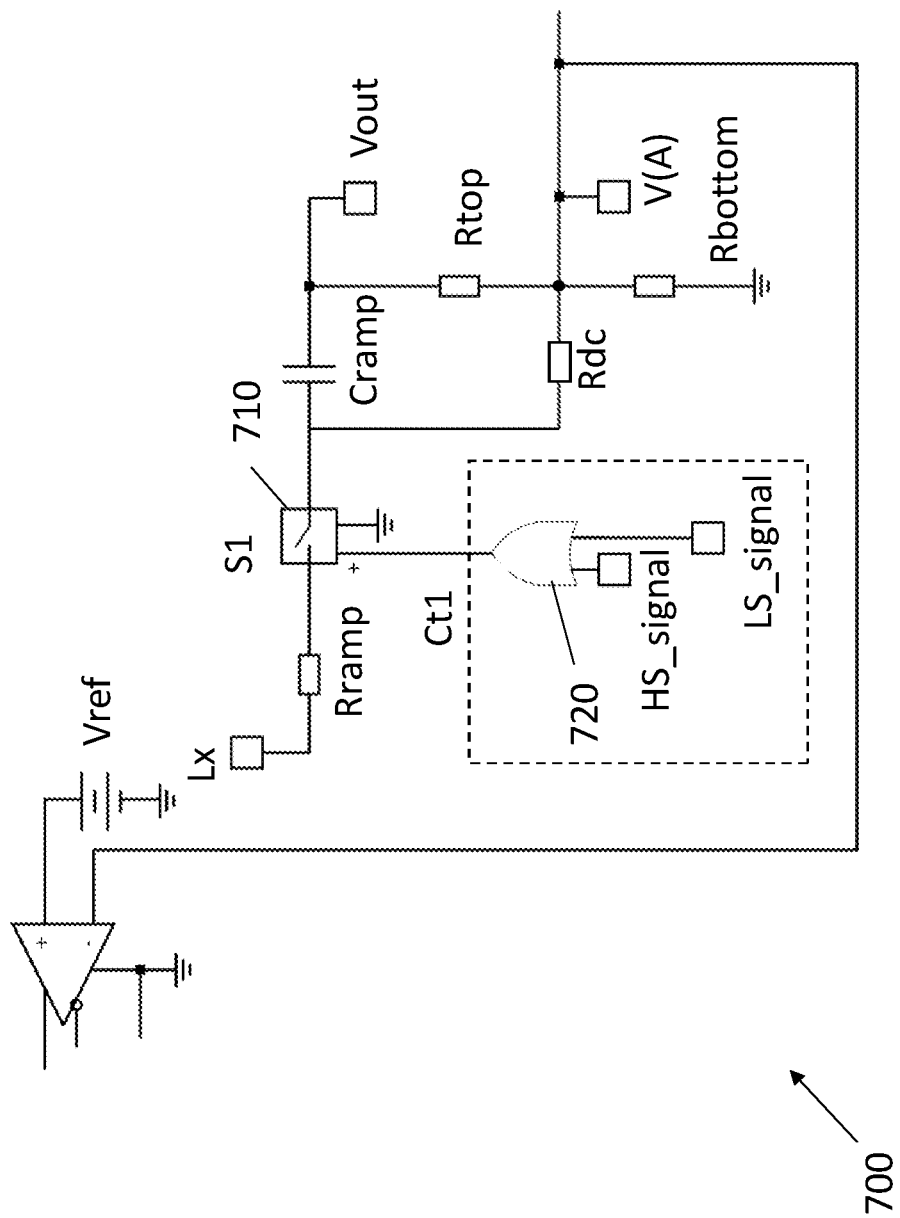
FIG. 7 is a diagram showing an example implementation of part of a ramp switch controller/driver for use in the circuit of FIGS. 5A and 5B.

FIG. 7 is a diagram of a circuit 700 showing an example implementation of part of a ramp switch controller/driver for use in the circuit of FIGS. 5A and 5B. In FIG. 7, the resistance Rdc could be replaced by a short wire or by capacitor Cdc as explained above with respect to FIG. 1.

The driver includes a logic gate 720 implemented as a two inputs OR gate. The OR gate 720 has a first inputs for receiving a first signal indicative of a state of the high side power switch and a second input for receiving a second signal indicative of a state of the low side power switch, and an output coupled to the ramp switch 710.

The first signal may be the high side drive signal, or a signal derived from the high side drive signal. Similarly, the second signal may be the low side drive signal, or a signal derived from the low side drive signal. The high side drive signal is referred to voltage at the switching node. A level shifter may be used to shift the drive signal with reference to ground.

In operation, the tri-state duration, when both the HS and LS power switches are off, indicates that the device is in DCM mode. The ramp switch S1 is then operated such that when the converter is in the tri-state, the ramp injection switch is off (open), otherwise, the ramp switch S1 is on (closed). The OR gate 720 receives signals indicative of the state of the HS and LS power switches. If both the high-side and low-side switches are off, the OR gate provides a control signal Ct1 having a low state (logic 0) and the ramp switch S1 is turned off, hence blocking the ramp injection at the switching node Lx. If at least one of the high-side and low-side power switches are on, the signal Ct1 is high (logic 1) and the ramp switch S1 is then turned back on (closed) hence allowing ramp injection.

The ramp switch 710 is only off (open) if both high-side and low-side power switches are off, in other words when the constant-on-time buck regulator is in the tri-state phase. However, the ramp switch 710 should not be turned off during the dead time of the regulator. The dead time occurs between the HS on LS off/HS off LS on sequence to prevent HS and LS to be on at the same time. During the dead time both the high-side switch and the low-side switch are off. If the ramp switch is off during the dead time additional noise would be injected into the control loop.

It will be appreciated that in CCM during the deadtime, both HS and LS switches are also off. However, this dead time only last for a very short time, typically 5-10 ns. A glitch filter may be used to filter it out, for instance a 20 ns long glitch filter. This will also prevent the ramp switch 710 from frequently switching between the on and off states unnecessarily.

Figure 8A:
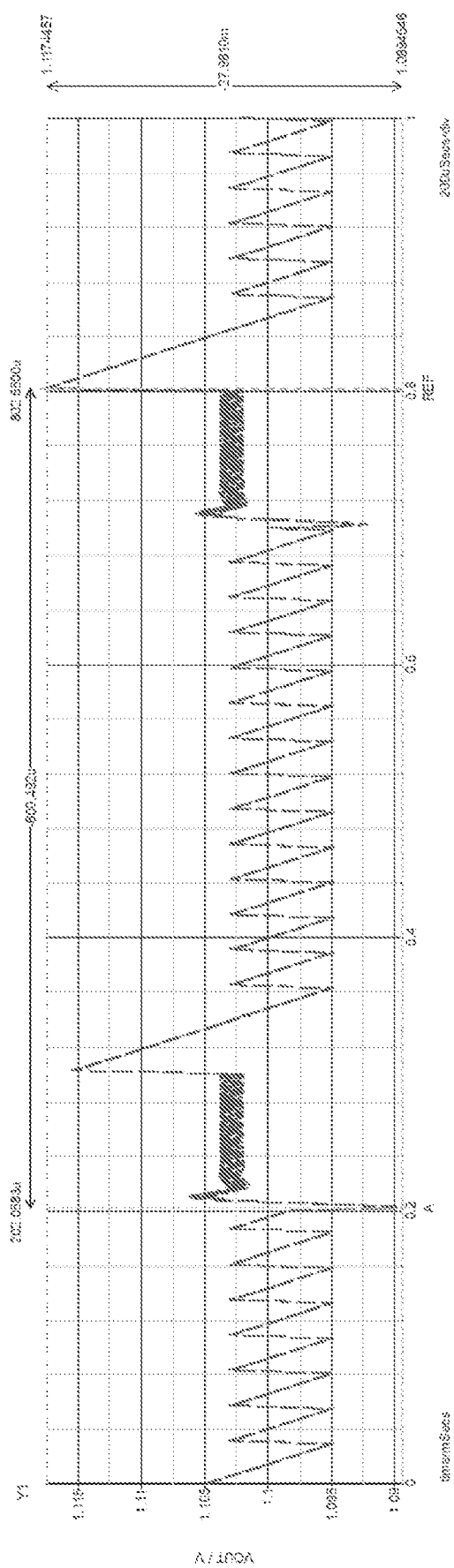
FIG. 8A is a simulation of the output voltage as a function of time obtained with the topology of FIG. 1.

FIG. 8A is a simulation of the output voltage as a function of time obtained with the topology of FIG. 1.

Figure 8B:
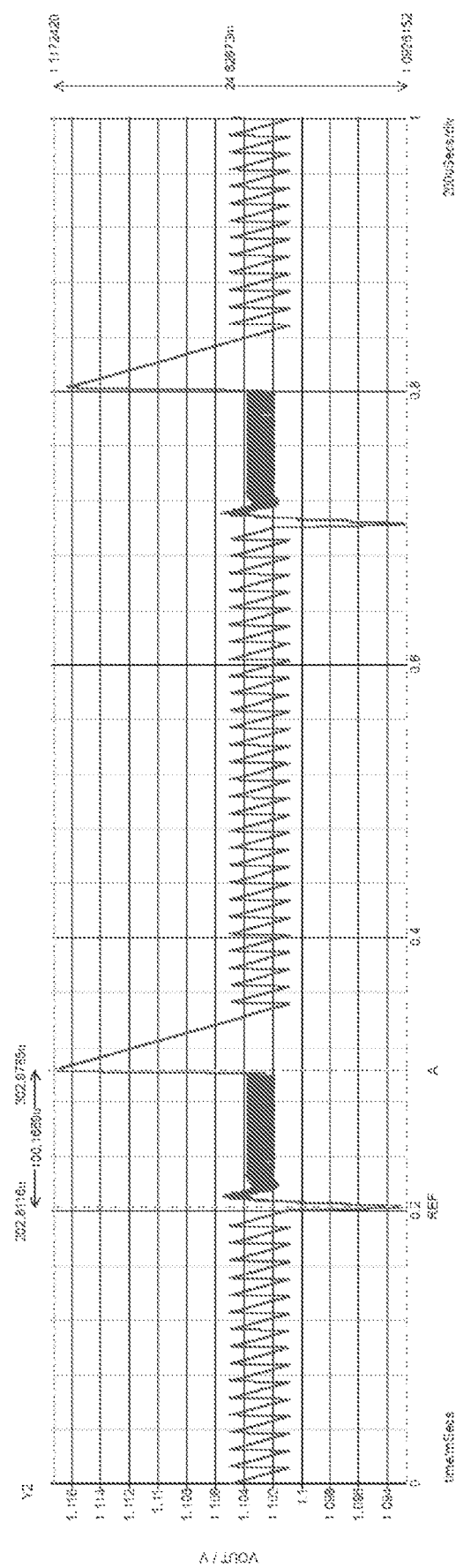
FIG. 8B is a simulation of the output voltage as a function of time obtained with the topology of FIG. 5.

FIG. 8B is a simulation of the output voltage as a function of time obtained with the topology of FIG. 5.

The transient response simulations of FIGS. 8A and 8B were obtained with the same test conditions.

Using the new topology with added ramp switch the total peak-peak transient result is slightly better, and there is no loop stability issue. The DCM valley point can move higher with the addition of the ramp switch. These benefits are due to the tri-state ramp injection blocking mechanism described above, which helps to lift-up DCM valley regulation point.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A switched mode power supply comprising:
a high side power switch coupled to a low side power switch at a switching node;
a ramp injection circuit coupled to the switching node, wherein the ramp injection circuit comprises a ramp switch; and
drive the high side power switch and the low side power switch;
receive a first signal indicative of a state of the high side power switch;
receive a second signal indicative of a state of the low side power switch;
generate, based on the first signal and the second signal, a control signal for controlling the ramp switch;
use the control signal to turn off the ramp switch when the switch mode power supply enters a tri-state; and
use the control signal to turn the ramp switch back on when the switch mode power supply exits the tri-state,
wherein the tri-state occurs when both the high side power switch and the low side power switch are turned off when the switched mode power supply operates in a discontinuous current mode.

2. The switched mode power supply as claimed in claim 1, wherein the driver is configured to sense when the switched mode power supply is operated in the discontinuous current mode, and to control the ramp switch during discontinuous current mode operation.

3. The switched mode power supply as claimed in claim 2, wherein the discontinuous current mode is sensed based on a state of the high side power switch and a state of the low side power switch.

4. The switched mode power supply as claimed in claim 2, wherein the driver is configured to sense when the switched mode power supply is operated in the discontinuous current mode by sensing both the high side power switch and the low side power switch are turned off for a duration greater than a threshold value.

5. The switched mode power supply as claimed in claim 1, wherein the driver comprises a logic gate for generating the control signal, the logic gate having a first input adapted to receive the first signal indicative of a state of the high side power switch and the second input adapted to receive a second signal indicative of a state of the low side power switch.

6. The switched mode power supply as claimed in claim 5, wherein the logic gate comprises an OR gate.

7. The switched mode power supply as claimed in claim 1, wherein the first signal derives from a high side drive signal for driving the high side power switch, and wherein the second signal derives from a low side drive signal for driving the low side power switch.

8. The switched mode power supply as claimed in claim 1, wherein the ramp injection circuit comprises a resistor coupled to a capacitor.

9. The switched mode power supply as claimed in claim 8, wherein the ramp switch is provided between the switching node and the resistor, or between the resistor and the capacitor of the ramp injection circuit.

10. The switched mode power supply as claimed in claim 8, wherein the ramp injection circuit is coupled to a resistive divider at a feedback node.

11. The switched mode power supply as claimed in claim 10, comprising a comparator having a first input coupled to the feedback node, and a second input for receiving a reference voltage.

12. The switched mode power supply as claimed in claim 11, comprising a pulse generator coupled to the comparator.

13. The switched mode power supply as claimed in claim 1, wherein the switched mode power supply is a constant on time converter.

14. The switched mode power supply as claimed in claim 1, wherein the switched mode power supply is a buck converter.

15. The switched mode power supply as claimed in claim 1, wherein the ramp switch is a bidirectional switch.

16. A method of operating a switched mode power supply having a high side power switch coupled to a low side power switch at a switching node, the method comprising:
providing a ramp injection circuit coupled to the switching node;
providing a ramp switch in the ramp injection circuit;
driving the high side power switch and the low side power switch;
receiving a first signal indicative of a state of the high side power switch;
receiving a second signal indicative of a state of the low side power switch;
generating, based on the first signal and the second signal, a control signal for controlling the ramp switch;
using the control signal to turn off the ramp switch when the switched mode power supply enters a tri-state; and
using the control signal to turn the ramp switch back on when the switched mode power supply exits the tri-state,
wherein the tri-state occurs when both the high side power switch and the low side power switch are turned off when the switched mode power supply operates in a discontinuous current mode.

* * * * *